(12) United States Patent
Malik et al.

(10) Patent No.: US 7,587,365 B2
(45) Date of Patent: Sep. 8, 2009

(54) CONTROLLING EXPENDITURES BY APPLYING RULES SPECIFIED FOR CATEGORIES OF PURCHASED ITEMS

(75) Inventors: Dale Malik, Atlanta, GA (US); Samuel Zellner, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 302 days.

(21) Appl. No.: 11/434,612

(22) Filed: May 16, 2006

(65) Prior Publication Data

US 2006/0218006 A1 Sep. 28, 2006

Related U.S. Application Data

(63) Continuation-in-part of application No. 09/608,184, filed on Jun. 30, 2000, now abandoned.

(51) Int. Cl.
  *G06Q 40/00* (2006.01)
(52) U.S. Cl. .................... 705/40; 705/35; 455/406; 455/407; 455/408; 455/409; 379/114.03; 379/114.15; 379/114.1; 379/114.19; 379/114.11; 379/114.12; 379/114.13
(58) Field of Classification Search .................... 705/40
  See application file for complete search history.

(56) References Cited

U.S. PATENT DOCUMENTS 5,857,079 A * 1/1999 Claus et al. .................... 705/33

OTHER PUBLICATIONS

Finney, Robert; Book "Essentials of Business Budgeting" New York AMACOM books 1995.*

* cited by examiner

*Primary Examiner*—Kirsten S Apple
(74) *Attorney, Agent, or Firm*—Myers Bigel Sibley & Sajovec, P.A.

(57) ABSTRACT

A monetary account, such as a prepaid account or credit account, that is used as payment for purchases is divided into categories of purchased items. When a purchase is attempted, a request to apply the monetary account specifies the category of the item being purchased. Rules associated with each of the categories of the account are applied in response to the request to determine whether to approve or deny the purchase. Rules may vary from one category to the next. As one example, a rule may include a remaining monetary value of the category where a determination is made whether the cost of the item being purchased is no more than the remaining monetary value. As another example, a rule may include whether a time of the purchase matches an allowable time for the category of the item being purchased. Other examples include rules that allow for borrowing from one category for purchases from another, for specific allocations, and for event triggers to generate alarms.

18 Claims, 6 Drawing Sheets

CONTROLLING EXPENDITURES BY APPLYING RULES SPECIFIED FOR CATEGORIES OF PURCHASED ITEMS

RELATED APPLICATIONS

The present application is a continuation-in-part of U.S. application Ser. No. 09/608,184, filed on Jun. 30, 2000, now abandoned which is incorporated herein by reference.

TECHNICAL FIELD

The present invention is related to monetary transactions involving the application of a monetary account for payment. More particularly, the present invention is related to applying item categories and rules for each category when using the monetary account for payment.

BACKGROUND

Currently, monetary accounts including debit accounts and credit accounts have only rudimentary controls on spending. In many cases, the only control is the remaining monetary value for the account. So long as a given purchase does not exceed the remaining monetary value, the purchase can be approved regardless of what the good or service happens to be. In some instances, corporate accounts have a per transaction monetary value limit on non-travel items. While debit and credit accounts are useful forms of payment, the lack of control reduces their applicability for controlling discretionary spending and ensuring that adequate funds exist to cover non-discretionary purchases.

Pre-paid accounts may be used for a single dimension of control for purchases. For example, a prepaid account may be associated with one specific store or with one specific type of good or service. Thus, the pre-paid account provides control for the funds in the account in that the funds may only be used at the particular store or only for the particular good or service. However, using a pre-paid card is ineffective for controlling non-discretionary spending for various reasons. For example, where the pre-paid card is associated with one specific store, there is no control over what is purchased within that store and purchases by the individual using the account may need to occur at other stores. Where the pre-paid card is associated with one specific good or service, the individual using the pre-paid account will need to make purchases for many other goods or services such that it is impractical to have a pre-paid card for every possible good or service that may be needed.

Typical examples of situations where discretionary spending needs control includes expenditures of college students, of business persons, and individuals without the capacity to otherwise manage their discretionary spending. In each of these cases, there may be a given amount of funds allotted per period to the account to cover both non-discretionary and discretionary spending and control is needed to ensure the discretionary spending does not overtake funds needed for the non-discretionary purchases.

SUMMARY

Exemplary embodiments address these issues and others by providing accounts that are divided into categories with rules established for each of the categories for generating an output such as to approve or deny the attempted purchases of items in the categories and/or to provide alerts when the use of the monetary account corresponds to a predefined event.

When a purchase is attempted involving use of the monetary account, a request is generated that specifies the category of the item being purchased. The rules established for the class may then be applied for the purchase, such as determining whether the monetary value remaining for the category is adequate to cover the purchase, whether the purchase is occurring during an allowable time for the category, and so forth.

One embodiment is a computer readable medium including instructions that perform acts. The acts include storing a remaining monetary value per category for at least one category of expenditures and receiving a request to apply a monetary amount for a current purchase, the request specifying the category of the current purchase. The acts further include determining whether the monetary amount for the current purchase is greater than the remaining monetary value for the category specified by the request. The acts further include applying the monetary amount for the current purchase by outputting a transaction approval and by reducing the remaining monetary value for the category specified by the request such that the reduced remaining monetary value is stored for consideration during a subsequent purchase when the monetary amount for the current purchase is not greater than the remaining monetary value for the category specified by the request.

Another embodiment is computer system that includes memory storing instructions and a database storing account data that comprises for each account, a set of categories and data defining a unique state of each category of each account. The computer system further includes a processor that implements the instructions to perform acts including receiving a request to complete a monetary transaction, the request identifying a category of expenditure for the monetary transaction. The acts further include determining from the database whether the transaction is permitted based on the category of expenditure for the monetary transaction in relation to the unique state of the category identified by the request.

Another embodiment is a computer readable medium containing instructions that perform acts including receiving a communication regarding a monetary transaction, the request identifying a category of expenditure for the monetary transaction and an account being used to pay, the category of expenditure being one of a plurality of categories. The acts further include determining whether the monetary transaction involving the category requires a particular output based on the identified category of expenditure for the monetary transaction in relation to a current unique state of the identified category of the account being used to pay. Additionally, the acts include generating an output appropriate for the current unique state of the category in relation to the monetary transaction.

DETAILED DESCRIPTION

Exemplary embodiments involve determining whether a current purchase attempt using a monetary account for payment should be approved or denied and/or whether some other output such as an alert should occur based on applying rules of the monetary account that are established for the category of the purchase. In this manner, discretionary spending can be controlled by having rules to limit the use of the monetary account for categories that correspond to discretionary items.

Figure 1:
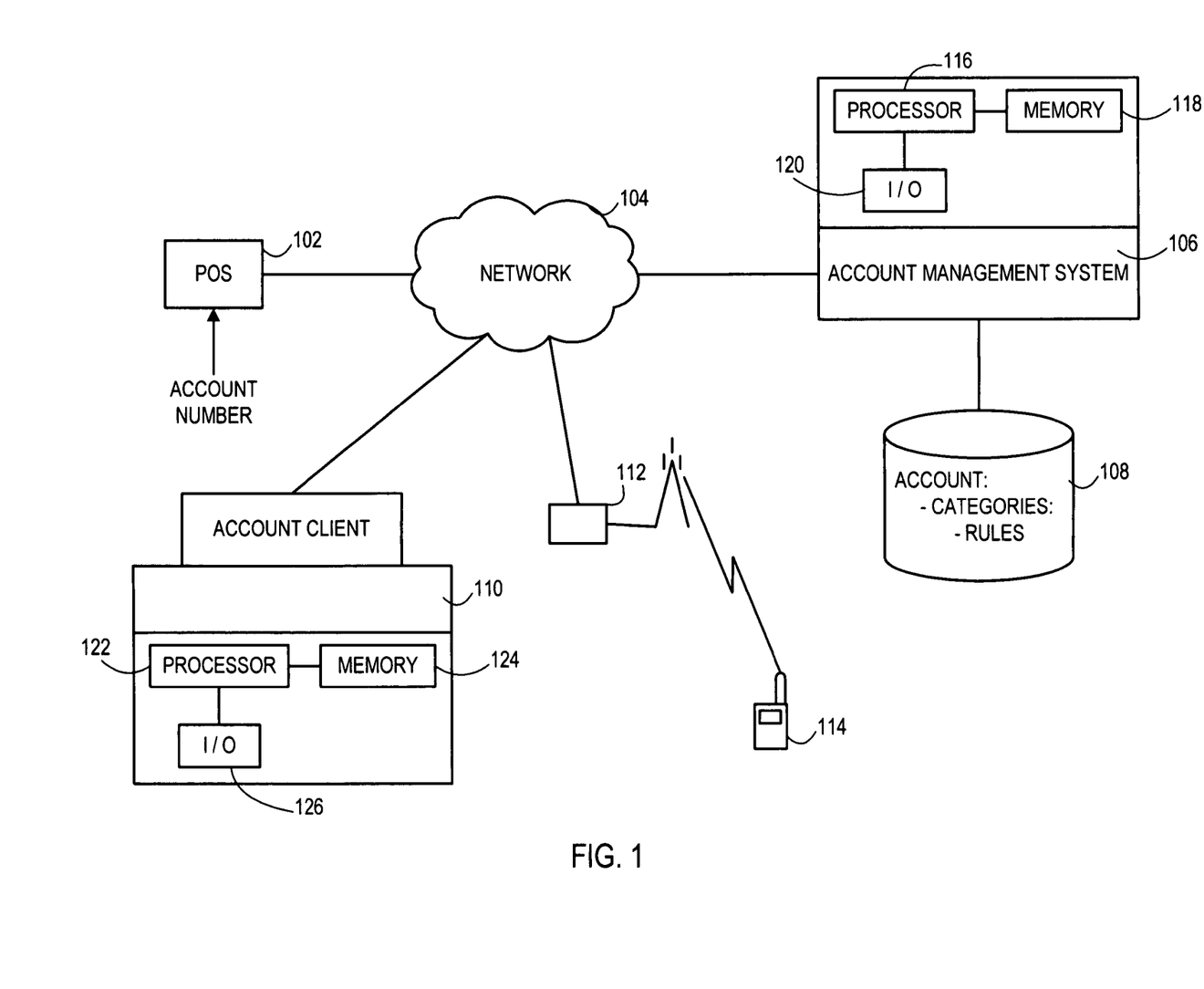
FIG. 1 shows the operating environment for an exemplary embodiment.

FIG. 1 shows one example of an operating environment for exemplary embodiments. One triggering event causing activity for a monetary account is an attempted purchase at a point-of-sale (POS) 102. Here, the user of the monetary account presents an account number to a POS 102 such as by swiping a card associated with the monetary account. It will be appreciated that the monetary account may operate on the basis of debits for some embodiments, where funds are present in the account, or on the basis of credit for other embodiments, where credit is present for the account as opposed to liquid funds. Thus, the card being presented may be a debit card or credit card, or the account number may simply be entered via a keypad or keyboard, such as where the POS 102 is a web site that the user of the monetary account is viewing on a personal computer in order to make a purchase.

Upon obtaining the account number, the POS 102 generates a request for the transaction to be approved and uploads this request via network 104 to a financial institution in charge of verifying and authorizing activities for the monetary account. The request includes a category for each of the items being purchased by the consumer. Those skilled in this art will appreciate that category-of-purchase information has traditionally been used by financial institutions to group purchases according to category on monthly account statements provided to the user to illustrate the previous month's account activities.

According to exemplary embodiments discussed herein, this category information may be used to look-up corresponding rules that have been established for the monetary account where the rules may be used to control whether the monetary transaction is approved and/or to provide a real-time or near real-time alert to an individual that is an interested party in the activities of the monetary account. As shown in FIG. 1, an account management system 106 is in communication with the network 104, where the rules are maintained for each of the categories of purchased items for the monetary account in an associated database 108.

The account management system 106 may be a sub-system of the financial institution that is in charge of the monetary account. In this scenario, the account management system 106 may utilize the rules for each of the categories of items being purchased to determine whether to approve or deny the pending transaction. In addition to approving or denying the transaction, the account management system 106 may also be utilized to provide alerts to interested parties such as the user and/or a superior of the user. Such alerts may be issued when the monetary transaction causes a change to a current state of the category where the result of the change is predefined to be an alert triggering event.

The account management system 106 may alternatively be independent of the financial institution in charge of the account, such as a third party service, where information for each of the requests is provided to the account management system 106 in addition to being provided to the financial institution. In this manner, the third party service may continue to issue the alerts even if the ability to approve or deny the transaction based on the rules of the categories is not available.

In either case, the account management system 106 may be implemented as one or more computer systems, having a processor 116, such as a general purpose programmable processor or an application specific processor. Furthermore, the processor 116 may access memory 118, for example, to obtain the programming instructions to perform logical operations and to create screenshots as discussed herein in relation to FIGS. 2-6. Furthermore, the account management system 106 may include an input/output (I/O) system 120 that may include a network interface for communicating bi-directionally with the network 104. The account management system may also include display devices, human interface devices for input, and so forth. Furthermore, according to an exemplary embodiment, the processor 116 has an interface to the database 108, which may exist either on local or external storage devices.

Thus, according to an exemplary embodiment, the account management system 106 makes use of a computer readable medium in order to implement the account management operations. Examples of a computer readable medium include electronic memory storage, optical storage disks, magnetic storage disks, data transfer media such as wireline and wireless communication links and the like.

The operating environment may also include account owner devices that are linked to the network 104, or through alternative networks, to the account management system 106. For example, the network 104 may be a dedicated network for monetary transaction communications such that the account owner devices do not communicate through the network 104 but instead communicate through a public network such as the Internet, the public-switched telephone network, or wireless telephone networks. As another example, the network 104 may be a general purpose network such as the Internet that carries both the monetary transaction communications from the POS 102 as well as communications from general client-server relationships including web browsers.

In either case, the account owner who may or may not be the account user utilizes a client computer 110 to access the account management system 106. The account owner may log into the account in order to perform various management tasks. For example, the account owner may log in to set the categories of interest, to assign rules to each of the categories, to make changes to the rules and categories as needed over time, and to transfer funds when necessary if not otherwise automated by a rule. Furthermore, the account owner (e.g., parent or guardian) or other interested party such as the account user may choose to receive alerts at the client computer 110 or other client device specified by the account such as a PDA or mobile phone. The alert may be provided in one of many forms such as email, short message, text message, instant message, voice message, and so forth.

The client computer 110 may be a typical personal computer or may be an application specific device. Furthermore, the client computer 110 may include a processor 122, such as a general purpose programmable processor or an application specific processor, may include memory 124 for storing programming instructions, and an I/O system 126 that may include output devices such as displays, printers, and audio and may include input devices such as a keyboard, mouse, microphone, and so forth. Thus, the client computer 110 also makes us of a computer readable medium in order to access and otherwise interact with the account management system 106.

Additionally, the account owner may utilize alternative devices for accessing the account management system and for receiving account alerts. For example, the account owner may utilize a wireless cellular device 114, pager, or other electronic client device that communicates via a wireless base station/gateway combination 112 or other telecommunications infrastructure with the network 104 to provide input to the account management system and to receive cellular audio and/or text alerts when appropriate. Other examples may include public switched telephone networks, where the account management system 106 may provide interactive voice response for purposes of account administration and/or may provide telephone calls as alerts.

Figure 2:
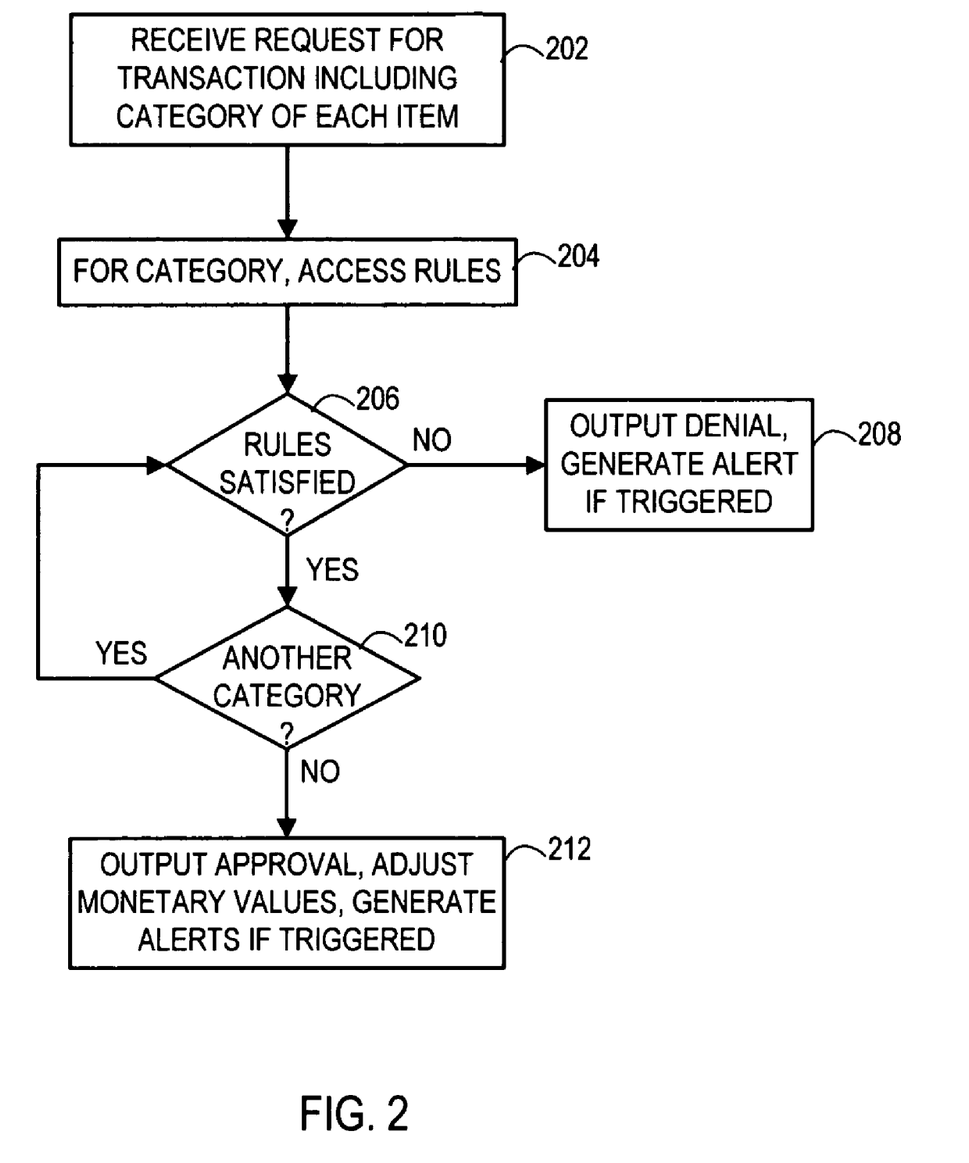
FIG. 2 shows one example of a high-level operational flow of a transaction according to an exemplary embodiment.

FIG. 2 shows a high-level example of an operational flow performed by an exemplary embodiment of the account management system 106. The operational flow begins at request operation 202, where an incoming request is received. The incoming request may be received either directly from a POS 102 in the case of a financial institution or may be received via the financial institution if a third party. The incoming request indicates that a purchase is pending and provides the category for each of the items being purchased in addition to the account number that has been provided by the user. Additional information may also be included in the request, such as an identification of the merchant, a current time where the attempted purchase is originating from, an identification of the specific good being purchased, and the like.

Upon receiving the request, the account management system accesses the rules for the specified category that have been stored for this account at rule operation 204. Upon accessing the rules, query operation 206 determines whether those rules are satisfied based on the current unique state of the category, e.g., is there an adequate remaining monetary value for the category of an item being purchased, is the current time permitted for the category of an item being purchased, and so forth. The rules may govern whether or not the pending purchase should be approved or denied and/or may govern whether an alert should be generated due to the pending purchase. If the rules are not satisfied, then an output may be generated at output operation 208 such as to deny the purchase and/or to provide an alert as to what rule or rules caused the purchase to be denied. If the rules are satisfied, then query operation 210 may be implemented to determine whether the single pending purchase includes other categories of items to be considered. Once all categories for the pending purchase have been considered and it has been determined that all rules are satisfied, then an output may be generated at output operation 212 such as to approve the purchase and/or to provide an alert if the resulting purchase causes a triggering event for one of the categories. Furthermore, an alert may be provided such as to the account owner when the triggering event occurs, such as to seek approval from the account owner for the transaction is such approval is required for the account or for the particular situation. For example, a transaction that exceeds a dollar amount and requires a shift from another category or an increase in the remaining value may require an authorization by the account owner. Shifting is discussed below.

Additionally, at output operation 212, the monetary values of the categories involved in the approved transaction are updated to account for the approved transaction and to thereby alter the unique state of each category that is involved. For example, the remaining monetary value of a category is reduced by the sum of the costs of each of the items in that category that have just been purchased.

Figure 3:
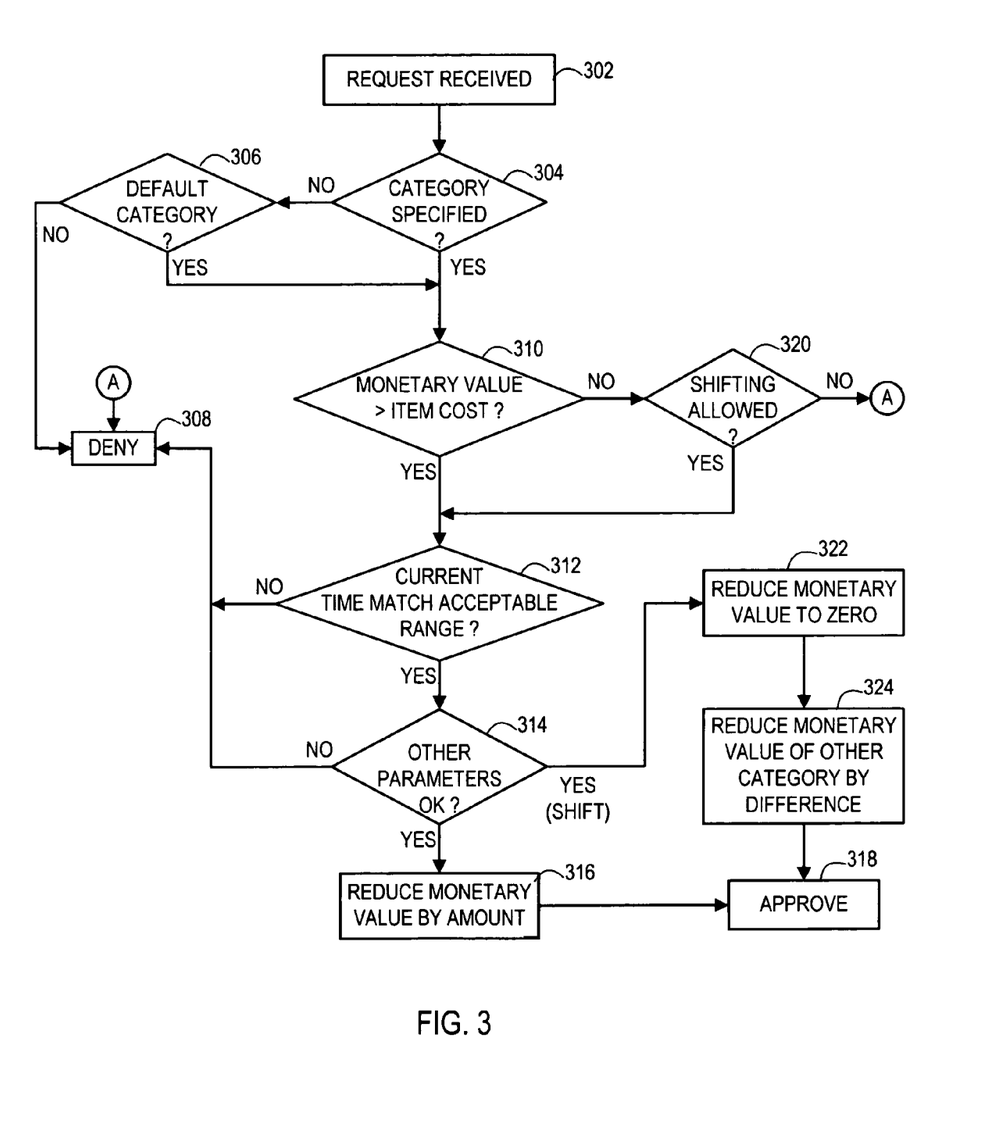
FIG. 3 shows one example of an operational flow of a transaction according to an exemplary embodiment.

FIG. 3 shows a more detailed example of an operational flow for approving or denying a pending purchase. Here, the operational flow begins at request operation 302 where the request is received that includes the aforementioned information. At query operation 304, a determination is made as to whether the category is specified in the request. It is conceivable that for some purchases, the category may not be provided from the POS 102. If not, then query operation 306 determines whether a default category has been established for the account identified by the request. For example, the account owner may specify a default account to serve as a catch-all, and the default account may have rules associated with it for handling transactions.

If a default account is not specified, then the transaction is denied at output operation 308, which concludes the operational flow for this particular pending transaction. If a default account is specified, then operational flow proceeds to query operation 310 where rules for the default account are applied for the pending transaction.

Returning to query operation 304, if it is determined that the category is specified for the pending transaction, then operational flow will proceed to query operation 310 where rules for the specified category are applied for the pending transaction. Specifically, query 310 applies a rule regarding the remaining monetary value associated with the category by determining whether remaining monetary value is greater than the amount of the purchase for this category. If not, then that means this purchase will exceed the amount of money that has been allotted to this category for this accounting period. In that case, query operation 320 determines whether shifting has been allowed for this category by the account owner.

Shifting allows funds represented by the remaining monetary value of another category to be used to cover purchases in the current category. For example, shifting may be allowed to pay for food from funds in an entertainment account where the funds in the food account have already been depleted for the period. In establishing shifting, the account owner may specify which categories can borrow from others and may specify which categories can be borrowed from. One example of establishing shifting is to set a hierarchy of categories, where one category can borrow from all lesser categories of the hierarchy. The bottom of the hierarchy may be a general expense area and rules may specify whether a particular category can or cannot invoke a shift from the general expense area.

If shifting is not allowed for the current category, then operational flow proceeds to output operation 308 where a denial is generated to conclude the processing for the pending transaction. If shifting is allowed, then operational flow proceeds to query operation 312 to apply additional rules.

Returning to query operation 310, if the remaining monetary amount of the category of the request is greater than the cost of the item, the operational flow may proceed to query operation 312 to apply additional rules. It will be appreciated that in addition to or as an alternative to the rule of query operation 310, a rule may be applied to determine whether the item being purchased exceeds a maximum item price that has been established for the category. For example, a rule may be set that no food purchase may exceed $25.00.

Returning to query operation 312, a determination may be made as to whether the current time of the transaction falls within an allowable range of transaction times. For example, the account owner may set a rule that food can only be purchased between the hours of 6 AM and 12 AM. If this rule is not satisfied, then operational flow proceeds to output operation 308 where the denial is generated to conclude processing for this transaction. If this rule is satisfied, then operational flow may proceed to query operation 314 where any other parameters for the category may be checked. For example, the account owner may have established prohibited items that can never be purchased, or the account owner may have established a special allocation such that a particular item may be purchased but only if it is a specified brand being purchased from a specified store and/or within a specified price range, and so forth. Other examples of special rules that must be satisfied for completion of the transaction involve the entry of a personal identification number (PIN) or other security information to prevent unauthorized users from making purchases with the account and the entry of date of birth information to restrict purchases of items such as alcohol or tobacco. If this rule setting forth any additional parameters is not satisfied, then operational flow proceeds to output operation 308 where the denial is generated to conclude processing for this transaction.

If this rule is satisfied and if a shift is being used for this transaction, then operational flow may proceed to reduction operation 322. Here, the remaining monetary value for the category of the request is reduced to zero. Then, at reduction operation 324, the remaining monetary value for the other category is reduced by the difference between what the item costs and what the remaining monetary value of the category of the item was before it was reduced to zero. As an alternative to reduction operations 322 and 324, a rule may be in place that when a shift is required, the entire cost of the item is covered by the other category such that only the remaining monetary value of the other category is reduced by the cost of the item. In either case, once the remaining monetary values have been adjusted to account for the cost of the item, an approval is generated at output 318 to conclude processing for the pending transaction.

Returning to query operation 314, if all other parameters are met for the category of the current purchase but a shift is not needed, then operational flow proceeds to reduction operation 316. Here, the remaining monetary value of the category of the item being purchased is reduced by the cost of the item to thereby update the unique state of the category. Then, an approval is generated at output 318 to conclude processing for the pending transaction.

Figure 4:
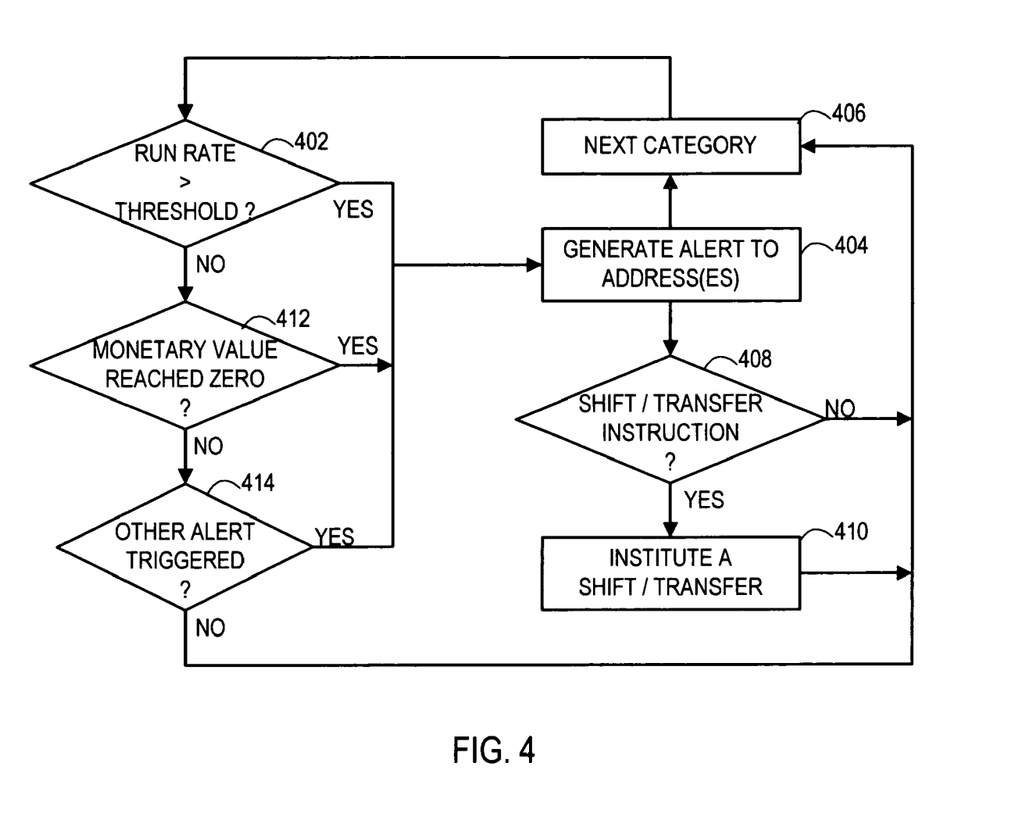
FIG. 4 shows one example of an operational flow of an alert generation according to an exemplary embodiment.

FIG. 4 shows an operational flow of an exemplary embodiment to provide alerts to various destination addresses of interested parties regarding noteworthy account activity. In this example, the account owner has previously set forth various triggering events such that when one of those triggering events occurs due to a transaction involving the monetary account, alerts are generated.

In this example, the operational flow begins at query operation 402 where it is determined from the current transaction that has concluded whether a run rate for the category exceeds a predefined threshold. The run rate is the rate at which the funds of a particular category are being spent in the current period, and in this example, the account holder has decided that exceeding the run rate should cause an alert. The predefined threshold for the run rate may be set by the account holder or may be automatically generated by the account management system to specify the maximum run rate that allows for the funds of the category to last until the end of the current period. If the new transaction has caused the run rate to be exceeded for the current period, then an alert is generated at alert operation 404.

When generating an alert, a message that is descriptive of the triggering event may be provided. For the run rate, the message may state that the run rate threshold has been exceeded for whichever category. The message may also be more elaborate, such as by specifying the number of days of the period that will remain once the remaining monetary value reaches zero for the category if the current run rate is continued. For the account user who is not the account owner, such as a college student or a business traveler, this message may be adequate. However, for the account owner and controller, the message may also suggest options for dealing with the situation, such as by suggesting a transfer of funds from one category to another, a transfer of funds from outside of the monetary account, or that shifting be allowed for the category if it is not currently allowed.

In addition to suggesting options, the alert to the account owner and controller may offer the option to proceed with a shift or transfer. For example, if the alert is an electronic mail message, the message may include a hyperlink for shifting or a hyperlink for a transfer such that the recipient of the electronic mail message may select one of the options to proceed with the change. As another example, the alert may provide a link to an administration control panel, such as the administration control panel of FIG. 6 which is discussed below. At the administration control panel, the account owner may then enter the instruction to allow a shift or to do a transfer of funds from one category to another. Query operation 408 detects whether a shift or transfer instruction has been received. If so, then the shift or transfer is instituted at account operation 410.

Returning to query operation 402, if the run rate threshold is not exceeded, then query operation 412 detects whether the remaining monetary value of the category has reached zero. If so, then operational flow proceeds to alert operation 404 where the alert can be generated, and then operational flow proceeds as discussed above. If not, then operational flow proceeds to query operation 414 where it is detected whether any other alert has been triggered by an event. For example, query operation 414 may detect that an attempt to purchase a prohibited item has occurred where the account owner has established a rule for generating the alert when certain an attempted purchase occurs for specified prohibited items. If such an event occurs, then operational flow proceeds to alert operation 404.

In this example, operational flow proceeds to the next category operation 406 after the account operation 410, after the alert operation 404, after the query operation 414, and also after query operation 408 where no instruction is provided. From next category operation 406, the series of queries are again applied in response to the next category for current account activity or in response to the next occurrence of account activity for any category.

Figure 5:
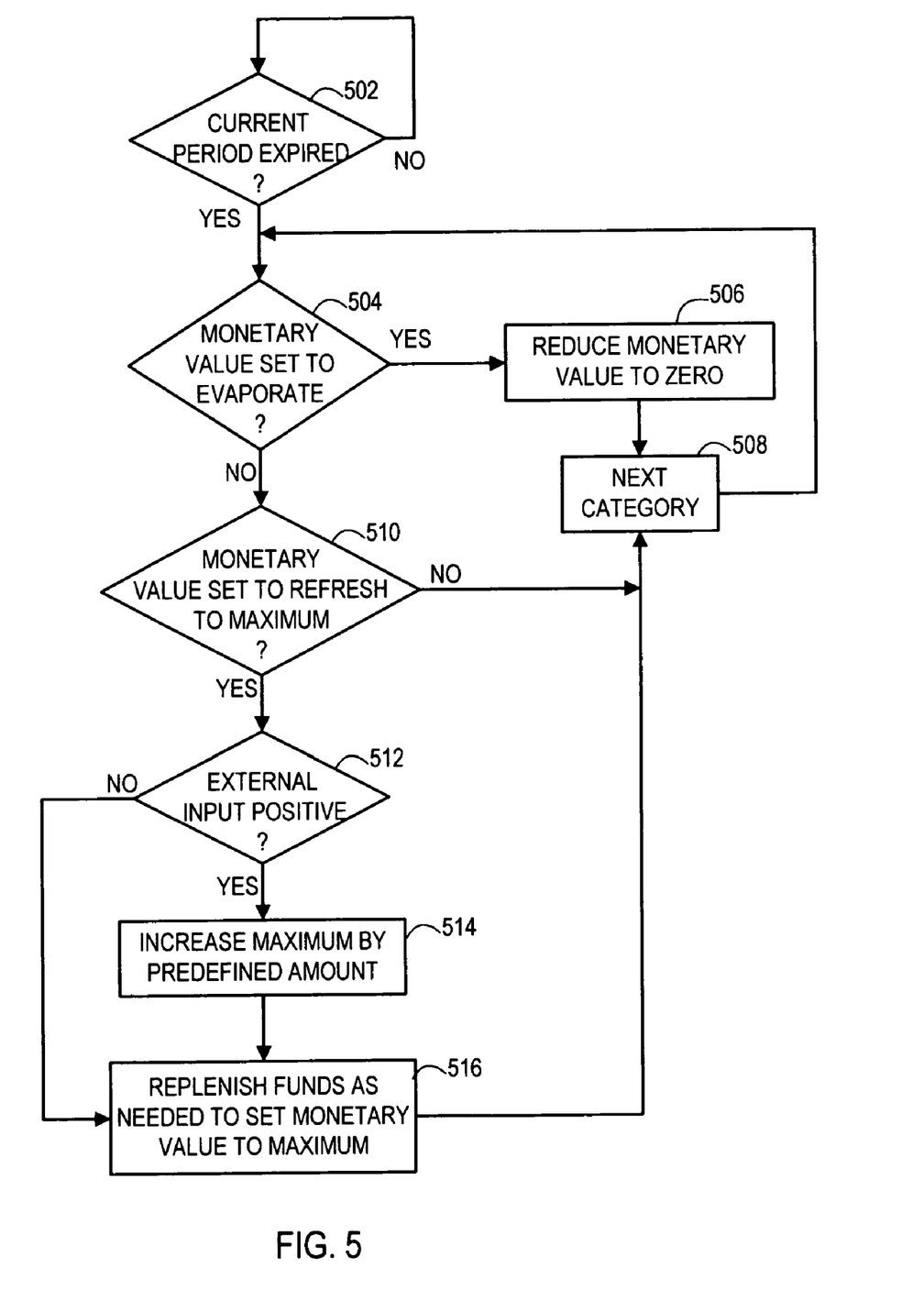
FIG. 5 shows one example of an operational flow of an account replenishment according to an exemplary embodiment.

FIG. 5 shows an example of an operational flow implemented by an exemplary embodiment of the account management system for handling the conclusion of a current account period for the monetary account. The account owner may establish rules for each category regarding activities at the end of an accounting period, such as whether to refresh the funds of the category to a maximum, whether to evaporate the funds of the category, whether to adjust parameters of the category based on external inputs, and so forth.

In this example, the operational flow begins at expiration operation 502 where it is determined whether a current accounting period has expired. The current accounting period may be an accounting period set by a financial institution, such as a monthly period, or may be set by the account owner, such as a weekly period, a college semester as the period, and the like. Furthermore, the accounting period may vary from one category of the account to another.

Upon expiration of the period, query operation 504 detects whether for a current category the monetary value is set to evaporate. For example, the account owner may wish that the funds for a category go away, such as being redirected to other categories, by being removed from the monetary account altogether, or by being returned to a general funds area not allocated to any particular category upon expiration of the period. If the monetary value is to evaporate, then the remaining monetary value for the category is reduced to zero at reduction operation 506. In doing so, the amount of funds available from a general funds area not associated with any of the categories being managed may then be increased by the corresponding amount removed from the current category. Then, consideration moves on to another category at next category operation 508.

If the remaining monetary value of the current category is not set to evaporate, then query operation 510 detects whether the remaining monetary value is set to automatically refresh to a predefined maximum. For example, the account owner may wish that the food account be refreshed to its maximum once the period has expired so that the maximum funds are available for purchasing food in the following period. As another example, the account owner may wish that an entertainment account not be refreshed so that the funds currently in the account must be stretched to cover subsequent periods. If the monetary value does not automatically refresh, then consideration moves on to another category at next category operation 508.

If the monetary value is set to refresh for the current category, then query operation 512 detects whether this category is affected by external inputs and whether those external inputs are positive. For example, the account owner who is a parent of a college student may wish for the predefined maximum of a particular category to be increased where the grades of the college student meet a particular standard. When the grades meet the standard, the result is positive at query operation 512. Thus, the account management system 106 may receive external data, such as from electronic data representing the grades of a college student or the sales numbers of a business person. The account management system 106 may then compare at query operation 512 those grades or sales numbers to the standard set by the account owner to determine whether the external input produces a positive result. If there is no external input, if external inputs are not set for consideration, or if the external input does not meet the standard, then query operation 512 finds that the external input is not positive.

When the external input is positive, then the predefined maximum established for the current category may be increased by a predefined amount. For example, grades meeting the standard might result in the maximum amount for the food category being raised by $20.00 per week. The increase to the maximum is performed at category operation 514. This increase may be a temporary one that is only effective for the current replenishment such that the increase must be earned again for the next period. Alternatively, the increase to the maximum may be permanent increase such that earning an increase in subsequent periods results in an additional increase to the maximum.

Then the funds themselves are replenished in the case of a debit account, or the credit is set back to the maximum amount in the case of a credit account, at replenish operation 516. When the external input is negative at query operation 512, then replenish operation 516 utilizes the existing maximum when replenishing the category rather than an updated maximum. Operational flow then returns to next category operation 508. Furthermore, the increase to the maximum monetary value may stop at the pre-defined maximum or may be set to exceed the pre-defined maximum by the amount left over for the category at the end of the period. Thus, the savings from one period to the next for a category accumulates above the pre-defined maximum and becomes available for spending in the subsequent periods.

It will be appreciated that the increase resulting from positive external inputs may be provided in other manners rather than by an increase to the maximum just prior to performing an end of period replenishment. For example, the external input may be updated several times during a given period. At each update, the external input may be compared to the standard to determine whether additional funds should be transferred to the category at that time rather than at the end of period replenishment.

Figure 6:
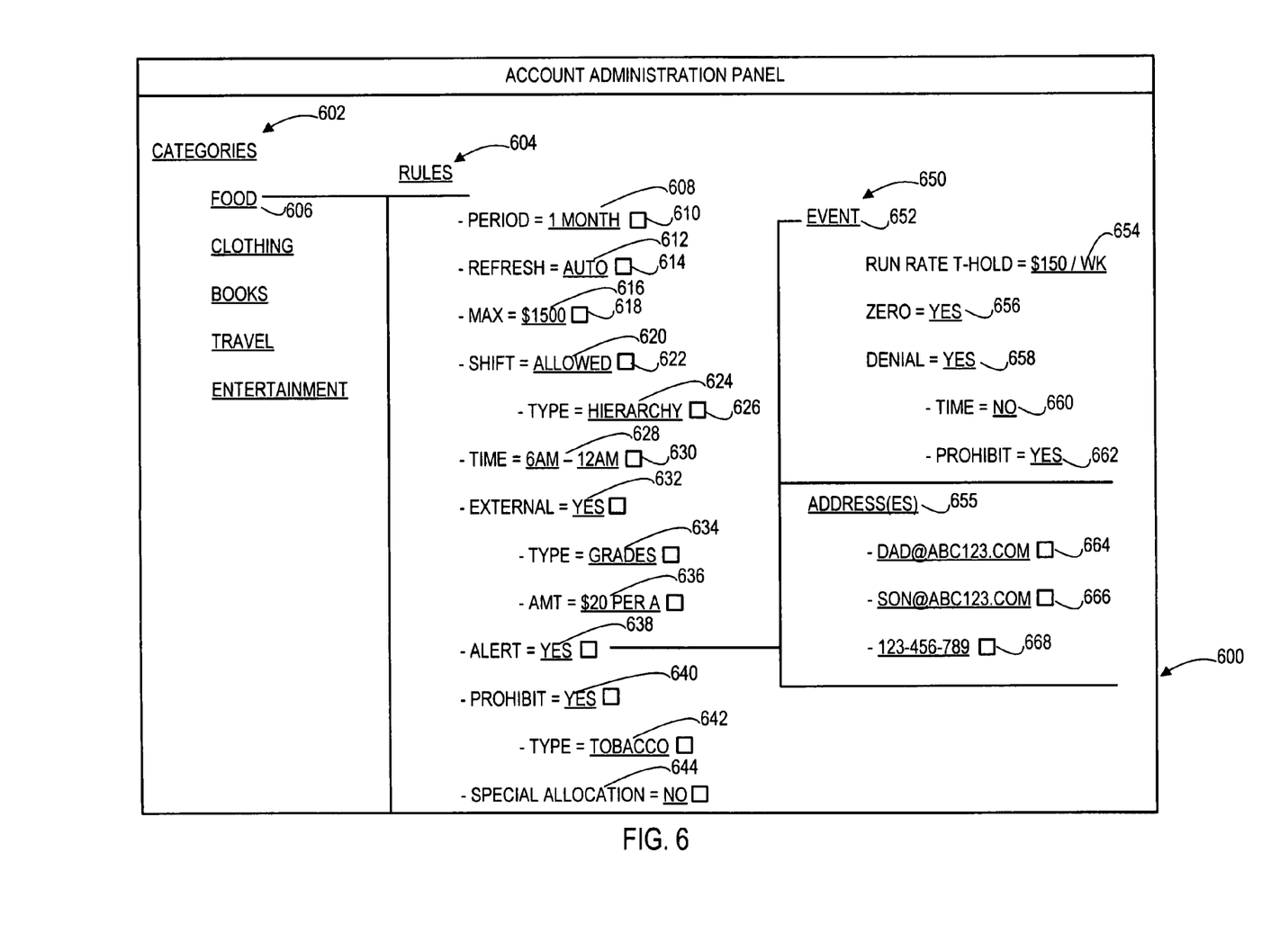
FIG. 6 shows one example of an administration panel screenshot according to an exemplary embodiment.

FIG. 6 shows an example of a screenshot 600 that may be displayed at the client computer 110 when the account owner is performing management tasks including defining the initial states for each of the categories as well as the rules to be applied for each category. As each category has its own settings to define its initial state and as purchases are made that alter the categories independently and differently, the state of each category is said to be unique relative to the other categories during the course of operation of the account management system. A first column 602 lists the categories for purchases to be made using the monetary account being managed. The account owner may add to the list as needed. Upon selecting a category 600, in this example "Food", a column 604 shows the rules that may be of already have been established.

In this example, the accounting period may be set for this category where field 608 shows the current setting and control button 610 allows the account owner to make a change. The refresh state for this category may be set where field 612 shows the current state and button 614 allows the account owner to make a change. As one exemplary aspect of establishing the unique initial state for this category, the predefined maximum remaining monetary value for this category may be set where field 616 shows the current maximum and button 618 allows the account owner to make a change.

As another exemplary aspect of establishing the unique state for this category, whether shifting is allowed for the current category by allowing funds to be used from other categories for purchases for this category is specified in field 620 and where button 622 allows the account owner to make a change. Furthermore, the type of shifting that may occur, i.e., whether to borrow from a specific category or to use a hierarchical process, is set forth in field 624 where button 626 allows the account owner to make a change.

Additional rules include the range of time when purchases for this category are permitted such that the category has a permissible state during that range and an impermissible state outside of the range. The range is specified in field 628, and button 630 allows the account owner to make a change. Whether to apply external inputs to adjust this category is specified in field 632, with the particular type of external input being specified in field 634 and with the standard and resulting increase being specified in field 636. Whether to generate alerts based on activity involving this category is specified in field 638. Whether certain items of this category are prohibited from being purchased is specified in field 640, while the specific types are set forth in field 642. Additionally, special allocations for this category may be set forth in field 644, such as by specifying whether a special allocation is set and then providing each parameter of the special allocation, such as specific item brand, store, price, time, etc.

Upon selecting one of the control buttons for a rule, the alert rule in this example, a third column 650 is displayed. In this example for the alert rule, the third column 650 displays a first section 652 where the triggering events for alerts of this category may be specified. The third column 650 also displays a second section 655 where the destination addresses for the alerts may be entered.

In the events section 652, each triggering event is specified. A run rate threshold is specified at field 654. Whether to alert on the remaining monetary value for the category reaching zero is specified at field 656. Whether to alert upon an attempted purchase being denied is specified at field 658, and whether to alert on the various reasons for the denial including the time of transaction or prohibited item is specified at fields 660, 662, respectively.

In the addresses section 655, each destination address for the alert is specified. The destination addresses may include email addresses, instant messenger addresses, short message addresses, phone/voicemail addresses, and so on. As shown, field 664 includes a first email address, field 666 includes a second email address, and field 668 includes a telephone number. Accordingly, some or all of the alerts as discussed in relation to FIG. 4 may be provided to each of the destination addresses.

According to exemplary embodiments, for a given account, various categories of items being purchased may be chosen, and initial states and rules may be defined. Through operation of the rules during attempted purchases, the transactions being attempted may be automatically accepted or denied such that there is automatic oversight to the purchases being made by the account user such that the account owner is relieved of much of the management burden. Furthermore, the account owner may be notified of noteworthy events so as to be informed of the attempted purchases and purchasing habits of the account user. The account owner may configure and modify the initial states and rules as desired to optimize the automatic oversight and the allocation of funds for use by the account user.

While the invention has been particularly shown and described with reference to various embodiments thereof, it will be understood by those skilled in the art that various other changes in the form and details may be made therein without departing from the spirit and scope of the invention.

What is claimed is:

1. A computer system, comprising:
   memory storing instructions;
   a database storing account data that comprises for each of a plurality of accounts, a set of categories and data defining a unique state of each category of each account of the plurality of accounts;
   a processor that implements the instructions to perform acts comprising:
      receiving a request to complete a monetary transaction, the request identifying a category of expenditure for the monetary transaction and an account used to pay; and
      determining from the database whether the transaction is permitted based on the category of expenditure for the monetary transaction in relation to the unique state of the category identified by the request for the account being used to pay, wherein when it is determined to permit the monetary transaction, outputting an approval of the monetary transaction.

2. The computer system of claim 1, wherein the unique state comprises a remaining monetary value in the category, the remaining monetary value ranging between a predefined maximum and zero.

3. The computer system of claim 2, wherein if the remaining monetary value in the category is sufficient to cover the monetary transaction, then the processor performs the acts of outputting the approval of the monetary transaction and reducing the remaining monetary value of the category by an amount necessary to cover the monetary transaction.

4. The computer system of claim 3, wherein if the remaining monetary value is insufficient to cover the monetary transaction, then the acts further comprise determining whether a remaining monetary value from a different category is available for monetary transactions of the category of the expenditure and if the remaining monetary value is available from a different category, then outputting an approval of the monetary transaction and reducing the remaining monetary value of the category of the expenditure down to zero and reducing the remaining monetary value of the different category by an amount necessary to cover the monetary transaction after having applied the remaining monetary value from the category of the expenditure.

5. The computer system of claim 1, wherein the unique state comprises a time period that matches a time period of the monetary transaction.

6. The computer system of claim 1, wherein the processor implements the instructions to further perform acts comprising:
   generating an alert upon detecting a predefined state for at least one of the categories.

7. A computer readable medium containing instructions that when executed by a processor perform acts comprising:
   storing account data that comprises for each of a plurality of accounts, a set of categories and data defining a unique state of each category of each account of the plurality of accounts;
   receiving a request to complete a monetary transaction, the request identifying a category of expenditure for the monetary transaction and an account used to pay; and
   determining from the database whether the transaction is permitted based on the category of expenditure for the monetary transaction in relation to the unique state of the category identified by the request for the account being used to pay, wherein when it is determined to permit the monetary transaction, outputting an approval of the monetary transaction.

8. The computer readable medium of claim 7, wherein the unique state comprises a remaining monetary value in the category, the remaining monetary value ranging between a predefined maximum and zero.

9. The computer readable medium of claim 8, wherein if the remaining monetary value in the category is sufficient to cover the monetary transaction, then outputting the approval of the monetary transaction and reducing the remaining monetary value of the category by an amount necessary to cover the monetary transaction.

10. The computer readable medium of claim 9, wherein if the remaining monetary value is insufficient to cover the monetary transaction, then determining whether a remaining monetary value from a different category is available for monetary transactions of the category of the expenditure and if the remaining monetary value is available from a different category, then outputting an approval of the monetary transaction and reducing the remaining monetary value of the category of the expenditure down to zero and reducing the remaining monetary value of the different category by an amount necessary to cover the monetary transaction after having applied the remaining monetary value from the category of the expenditure.

11. The computer readable medium of claim 7, wherein the unique state comprises a time period that matches a time period of the monetary transaction.

12. The computer readable medium of claim 7, further comprising generating an alert upon detecting a predefined state for at least one of the categories.

13. A method comprising:
storing account data that comprises for each of a plurality of accounts, a set of categories and data defining a unique state of each category of each account of the plurality of accounts;
receiving a request to complete a monetary transaction, the request identifying a category of expenditure for the monetary transaction and an account used to pay; and
determining by a computer from the database whether the transaction is permitted based on the category of expenditure for the monetary transaction in relation to the unique state of the category identified by the request for the account being used to pay, wherein when it is determined to permit the monetary transaction, outputting an approval of the monetary transaction.

14. The method 13, wherein the unique state comprises a remaining monetary value in the category, the remaining monetary value ranging between a predefined maximum and zero.

15. The method of claim 14, wherein if the remaining monetary value in the category is sufficient to cover the monetary transaction, then outputting the approval of the monetary transaction and reducing the remaining monetary value of the category by an amount necessary to cover the monetary transaction.

16. The method of claim 15, wherein if the remaining monetary value is insufficient to cover the monetary transaction, then determining whether a remaining monetary value from a different category is available for monetary transactions of the category of the expenditure and if the remaining monetary value is available from a different category, then outputting an approval of the monetary transaction and reducing the remaining monetary value of the category of the expenditure down to zero and reducing the remaining monetary value of the different category by an amount necessary to cover the monetary transaction after having applied the remaining monetary value from the category of the expenditure.

17. The method of claim 13, wherein the unique state comprises a time period that matches a time period of the monetary transaction.

18. The method of claim 13, farther comprising generating an alert upon detecting a predefined state for at least one of the categories.

* * * * *

UNITED STATES PATENT AND TRADEMARK OFFICE
CERTIFICATE OF CORRECTION

PATENT NO.        : 7,587,365 B2                                            Page 1 of 1
APPLICATION NO.   : 11/434612
DATED             : September 8, 2009
INVENTOR(S)       : Malik et al.

It is certified that error appears in the above-identified patent and that said Letters Patent is hereby corrected as shown below:

In the Claims:
Column 14, Claim 18, Line 21:  Please correct "farther" to read -- further --

Signed and Sealed this
Sixth Day of November, 2012

David J. Kappos
*Director of the United States Patent and Trademark Office*